United States Patent
DeLeo et al.

[15] 3,646,811
[45] Mar. 7, 1972

[54] PRESSURE SENSOR FOR DETERMINING FLUID VELOCITIES

[72] Inventors: Richard V. DeLeo, Hopkins; Floyd W. Hagen, Minneapolis, both of Minn.

[73] Assignee: Rosemount Engineering Company, Minneapolis, Minn.

[22] Filed: Sept. 22, 1969

[21] Appl. No.: 859,804

[52] U.S. Cl. .................................................73/182, 73/212
[51] Int. Cl. ..........................................................G01c 21/10
[58] Field of Search ..........................73/181, 182, 189, 212

[56] References Cited

UNITED STATES PATENTS 2,789,433  4/1957  Goudy .....................................73/212

FOREIGN PATENTS OR APPLICATIONS 1,127,110  8/1956  France.....................................73/212

*Primary Examiner*—Donald O. Woodiel
*Attorney*—Dugger, Peterson, Johnson & Westman

[57] ABSTRACT

A fluid-measuring system comprising an orthogonal velocity sensor utilizing fluid pressures which can be adapted for use in flight or mobile or fixed installations. The sensor comprises a probe that is internally divided into four compartments with the longitudinal axis at right angles to the plane of orthogonal measurement, and with sensing ports oriented in proper relationship to sense the orthogonal directions of velocity moving past the sensor. By measuring pressure differences between chambers on opposite sides of the probe, and using suitable pressure instrumentation the relative airspeed in the orthogonal directions can be determined.

15 Claims, 4 Drawing Figures

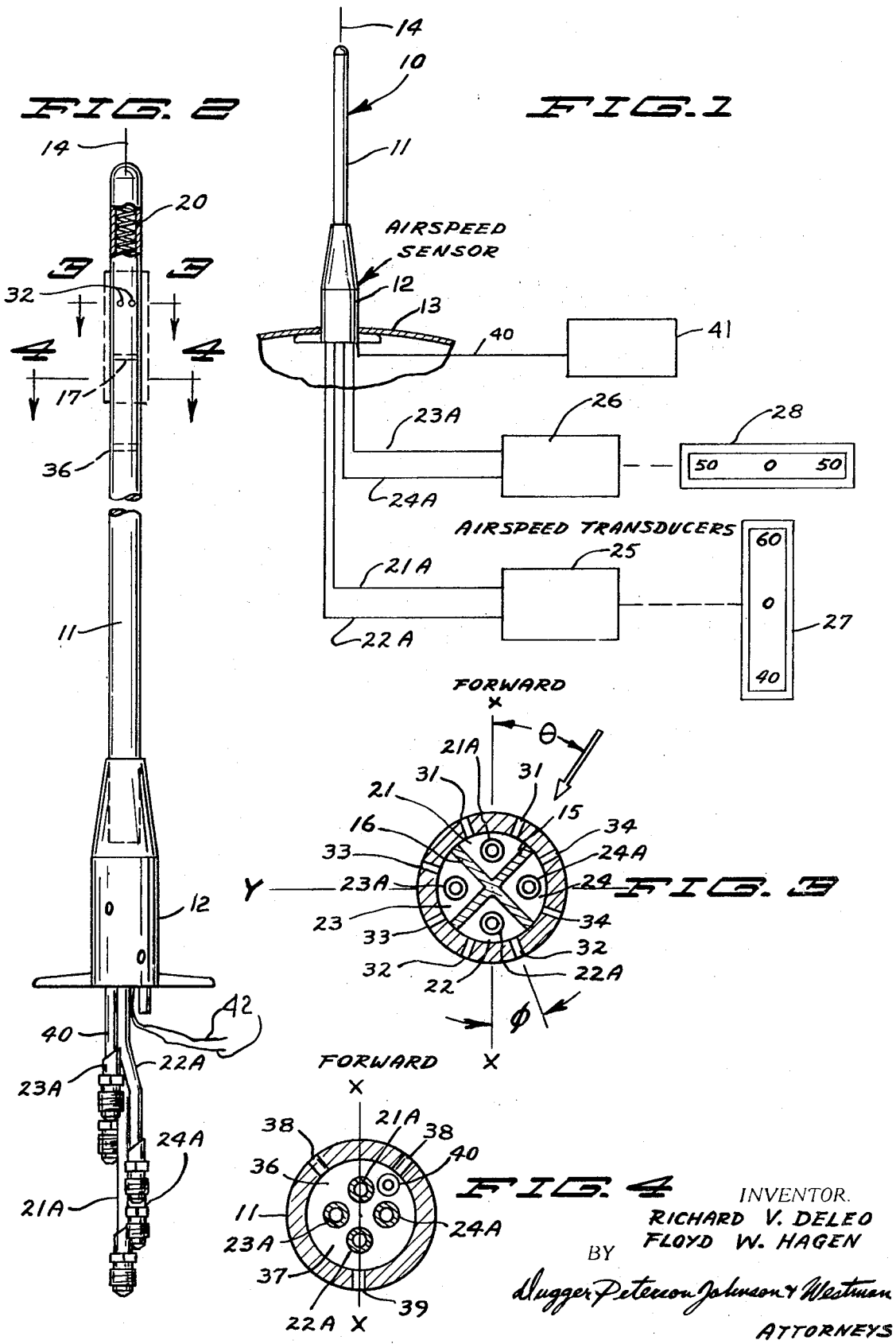

PRESSURE SENSOR FOR DETERMINING FLUID VELOCITIES

BACKGROUND OF THE INVENTION

1. Field of the Invention

The present invention relates primarily to airspeed measuring systems for use where relative airspeed is necessary and which will measure the fore, aft and side direction airspeed independently.

2. Prior Art

Prior art measurement of orthogonal airspeeds or resultant airspeeds have been primarily developed through the concept of wind-driven devices such as propellers or anemometers. These devices, though they are accurate, are generally fragile and at the same time are bulky and heavy, and therefore generally considered unacceptable for flight applications as well as for other mobile applications. Another type of prior art device utilizes electrically heated wires which are cooled off as airflow increases. These devices are also fragile and have been found to be unsuitable for flight and mobile installations. Both of these prior art devices are generally slow in response as they have thermal or mass inertia.

A crosswind sensing system is shown in U.S. Pat. No. 3,447,372 and actually includes a type of a sensor for sensing crosswind in an orthogonal direction.

SUMMARY OF THE INVENTION

The present invention relates to an airspeed sensor utilizing pressure signals in orthogonal directions to determine relative airflow. The sensor has no moving parts. The pressure differences in the orthogonal direction are transmitted by suitable tubing to transducers and these transducers provide electrical signals proportional to pressure differential. By utilizing signals in more than one direction, vector airflows can be determined, and by utilizing two separate sensors, it is possible to obtain the airflow vector in three dimensions.

The unit comprises a probe having four chambers divided along a longitudinal axis into orthogonally oriented chambers, and then air pressure differences in the chamber in the direction along the measuring plane of the chambers determine airflow in that particular direction. The unit can be used for an air vehicle such as a helicopter and signals from the unit can be fed into automatic flight control systems for vectoring the helicopter aircraft directly into the relative wind especially at takeoff and landing time. The system also finds utilization on military vehicles and gun carriers to derive accurate crosswind data for correction of projectile trajectories.

BRIEF DESCRIPTION OF THE DRAWINGS

FIG. 1 is a fragmentary schematic view of an orthogonal airspeed sensor made according to the present invention showing transducers used in connection therewith;

FIG. 2 is an enlarged side elevational view of the sensor of FIG. 1;

FIG. 3 is a sectional view taken as on line 3–3 in FIG. 2;

FIG. 4 is a sectional view taken as on line 4–4 in FIG. 2 and showing static pressure sensing measuring ports therein.

DESCRIPTION OF THE PREFERRED EMBODIMENTS

The air pressure sensor for determining airspeed is illustrated generally at 10. The device comprises an upright cylindrical probe 11 having a circular cross section as shown, and mounted with a mounting member 12 to a surface 13 of an aircraft or stationary object that the unit is to be used with. The probe has a longitudinal axis 14 which is at right angles to the plane of measurement of the airspeed. In other words, as shown in FIGS. 1 and 2, the airspeed measurements will be taken along orthogonal axes in a plane perpendicular to the plane of the paper and to the axis 14.

The interior of the probe 11, in the portions used for sensing airspeed, as shown in FIG. 3, is divided into four sealed compartments with internal longitudinally extending walls 15 and 16. Both walls 15 and 16 extend diametrically and intersect at the center portions thereof. A transverse bulkhead 17 seals off these chambers at one end thereof. The outer end of the probe is closed and it is shown as hemispherical although this shape is not of critical importance. A heating element shown generally at 20 is formed into the interior of the probe to provide for deicing. The bulkhead 17 is shown on dotted lines in FIG. 2. Thus, there are two longitudinally extending chambers 21 and 22, which are diametrically opposed, or on opposite sides of the quadrants defined by the walls 15 and 16, and chambers 23 and 24 which are also diametrically opposed.

Each of the chambers have a pressure tube open thereto. The chamber 21 has a tube 21A open thereto; and chamber 22 has tube 22A open thereto; chamber 23 has a tube 23A open thereto; and the chamber 24 has a tube 24A open thereto. These tubes in turn are connected to suitable transducers 25 and 26. A transducer 25 is connected to tubes 21A and 22A and senses the differential pressure between chambers 21 and 22. Transducer 26 is connected to tubes 23A and 24A and senses the differential pressure between chambers 23 and 24. The transducers 25 and 26 each includes electrical circuitry to give an output signal proportional to the square root of this differential pressure signal. The signals from the sensors 25 and 26 are utilized for indicating airspeed in the orthogonal direction on instrumentation illustrated at 27 and 28, respectively.

The probe 11 is positioned with its central longitudinal axis 14 at right angles to the plane of measurement of the airspeed. In addition, the probe is oriented along X and Y axes as indicated in FIG. 3. The X and Y axes are positioned in the proper directions for the desired measurement on the device. For example, the X axis would be positioned fore and aft in direction on a helicopter, and the Y axis would be from left to right or side to side. The X and Y orthogonal axes are positioned to bisect the chambers that they are related to. The X axis as shown bisects chambers 21 and 22 and the Y axis as shown bisects chambers 23 and 24. The sensor has to be properly positioned to function correctly. Suitable pressure sensing ports 31 open into the chamber 21, and pressure sensing ports 32 open into the chamber 22. These ports, as shown, are positioned at an angle $\psi$ from the X axis and there are two ports as shown. If desired a single port that is elongated and transverse to the X axis could be used. The reason for having the two ports as shown is to given an averaging of the pressure when airflows are other than directly on the X axis. The vector component sensed, however, will be only along the X axis when chambers 21 and 22 are used for measurement.

Sensing ports 33 open into the chamber 23, and ports 34 open into the chamber 24. The ports 31–34 are shown to be all on the same plane. Actually, the ports could be staggered in direction along the longitudinal axis of the probe if desired without harming the sensing function, but the ports should be positioned a substantial distance from both the end of the probe, and from the mounting of the probe. The ports should be spaced a minimum of six probe diameters from the tip of the tube in order to make sure that the flow around the tip does not cause erroneous pressure functions to be generated at the ports even if the flow is not perpendicular to the probe. Thus the probe is quite elongated in relation to its diameter, being in the ratio of ten or more diameters long. The holes or ports are normally located on the same plane for ease of manufacture. As shown, angle $\psi$ is approximately 22° to 28° on either side of the orthogonal sensor axes for each of the chambers. The chambers are sealed against flow and leakage except for their outlet tubes. The port diameters are about 1/10 tube outside diameter, as shown.

Referring to FIG. 3 and the ports shown therein, it has been found experimentally that the pressure difference between chambers located to sense pressures along opposite or orthogonal axes is proportional to the product of the impact pressure ($q$) and $\cos^2 \theta$ where $\theta$ is the angle between the velocity vector and the orthogonal "X" sensor axis. This angle $\theta$ is shown in FIG. 3, and the velocity vector is also shown. Similarly the outputs from chambers 24 and 23 are proportional to the impact pressure times $\sin^2 \theta$ or $\cos^2 (90-\theta)$. The equations involved are shown as Equations (1) and (2) below.

$$\Delta P_{1,2} = A q \cos^2 \theta \quad (1)$$
$$\Delta P_{3,4} = A q \cos^2 (90-\theta) = Aq \sin^2 \theta \quad (2)$$

Equation (3) follows by simple addition:

$$\Delta P_{1,2} + \Delta P_{3,4} = A q (\cos^2 \theta + \sin^2 \theta) = A q \quad (3)$$

Combining Equations (1) and (3) we can obtain flow direction angle ($\theta$) from:

$$\cos^2 \theta = \Delta P_{1,2} / \Delta P_{1,2} + \Delta P_{3,4} \quad (4)$$

For low airspeeds and incompressible fluids, the impact pressure "$q$" may be approximated by Equation (5):

$$q = \tfrac{1}{2} \rho V^2 \quad (5)$$

Equations (1a), (2a) and (3a) follows:

$$\Delta P_{1,2} = \beta \rho V^2 \cos^2 \theta = \beta \rho V_x^2 \quad (1a)$$
$$\Delta P_{3,4} = \beta \rho V^2 \sin^2 \theta = \beta \rho V_y^2 \quad (2a)$$
$$|\Delta P_{1,2}| + |\Delta P_{3,4}| = \beta \rho V^2 \quad (3a)$$

Velocities $V_x$, $V_y$ and $V$ again follow as Equations (1b), (2b) and (3b):

$$V_x = (\Delta P_{1,2} / \beta \rho)^{1/2} \quad (1b)$$
$$V_y = (\Delta P_{3,4} / \beta \rho)^{1/2} \quad (2b)$$
$$V = [(\Delta P_{1,2} + \Delta P_{3,4}) / \beta \rho]^{1/2} \quad (3b)$$

where $\rho$ = density in slugs/ft$^3$,
where $\beta$ = calibration constant, approximately equal to 0.65.

Utilizing Equations (1b), (2b) and (3b) the true airspeed or fluid velocity can be determined from a combination of $\Delta P$ and a density measurement. The density of air is commonly determined from a pressure and temperature measurement e.g., $\rho = P/RT$. As will be described later the pressure and temperature measurement may also be included in the airspeed sensor.

A simplifying assumption that a flight vehicle operates only at sea level permits use of a constant density. Hence, we can then arrive at Equations (1c) and 2c) where $V_{ix}$ and $V_{iy}$ are the indicated airspeeds in knots, assuming sea level density.

$$V_{ix} = (\Delta P_{1,2} / \beta \rho s1) 41^{1/2} = C (\Delta P_{1,2})^{1/2} \quad (1c)$$
$$V_{iy} = (\Delta P_{3,4} / \beta \rho s1)^{1/2} = C (\Delta P_{3,4})^{1/2} \quad (2c)$$
$$V = C (\Delta P_{1,2} + \Delta P_{3,4})^{1/2} \quad (3c)$$

The two pressure outputs from the orthogonal airspeed sensor will be per Equation (1a) and (2a). With the known calibration constants and appropriate airspeed transducer, a voltage output can be made proportional to the indicated airspeeds in orthogonal directions per Equations (1c), (2c) and (3c).

In all of the preceding equations the pressure differences between the associated chambers are positive values and all equations give magnitudes only. If the pressure differentials are taken in a fixed sense, namely $(P_{21}-P_{22})$ and $(P_{23}-P_{24})$, the sign of the pressure difference will change with flow direction as follows.

Differential pressure at chambers 22 and 23 is positive for flow from the forward direction and is negative for flow from aft direction. Differential pressures in chambers 23 and 24 is positive for flow from the left direction and negative for flow from the right direction. Thereby noting the sign and magnitude of the reading in left-to-right or fore-and-aft direction the orthogonal components of the flow is determined in the Equations (1), (2) and (4).

Thus, by taking the differential pressures in the sets of chambers arranged in proper direction along the desired orthogonal axis, with sensing ports properly arranged with respect to the orthogonal axis and using sealed chambers inside the probe, the airspeed in the orthogonal directions can be accurately determined. The instruments are made to read the pressure signals from the transducers 25 and 26. The transducers include circuitry to perform the necessary arithmetic functions (square root of the signal) to make direct reading of the airspeeds in each of these orthogonal directions available on the indicator.

When a curve is plotted using differential pressure ($\Delta P$) on a vertical axis and angle $\theta$ on a horizontal axis a $\cos^2$ curve is obtained in accordance with Equation (1) for the probe configuration shown in FIG. 3. This curve can be modified and changed if the position, shape or size of the sensing ports is changed. For example, if a more linear relation is desired between $\theta$ and $\Delta P$, in the neighborhood of $\theta$ equals zero, this can be attained by reducing the angle $\Phi$.

In flight and flow applications it is also desirable that there is an output that is proportional to the atmospheric static pressure or pressure altitude. When an orthogonal sensor is being utilized, as in the present invention, a problem of where to locate a static pressure sensing port occurs because the sensor holes previously described are positioned so that they are impact pressure sensitive and therefore not usable.

It has been found that for a cylinder in flow at airspeeds such as are necessary to develop an impact pressure "$q$," sensing ports or holes that are properly oriented with respect to the direction of flight will give an accurate measurement of static pressure across a fairly wide range of flow directions on the probe itself. As shown in FIGS. 2 and 4, the bulkhead 17 divides off the orthogonal sensing chambers. Another bulkhead is provided at 36 to seal off a static pressure chamber 37. Pressure sensing ports are arranged so that there are two ports 38 having their axes at substantially 30° to the X axis, and these are arranged on the forward side of the sensing tube. An aft pressure port 39 is located substantially on the X axis at the aft position, and is of smaller size than the two forward ports 38. In other words, the port 39 opens substantially 180° from the expected direction of flow. Experimental data has shown that pressure output of this particular configuration will be within $0.08q$ for all airspeeds over a flow direction change of plus or minus 30° (a 60° range) from the tube forward direction or the X—X axis.

Thus, if flight vehicle moves rapidly forward and changes direction, pressure output from the static pressure chamber will be relatively unaffected by this directional or airspeed change. The static pressure output is connected through a static pressure-sensing tube 40 to a suitable instrument 41 such as an absolute pressure transducer or an altimeter. The more restricted the flow direction range in normal operation, the more accurate the static pressure output can be made by the selection of hole sizes and locations. In any event, the averaging effect of the impact pressure on the two forwardly facing ports and a negative pressure on the rearwardly facing or aft port cooperate to give a reliable static pressure reading even when the ports being used are subjected to impact pressures.

For true airspeed measurements, a fluid temperature measurement may be derived from a sensor located generally on or in the airspeed sensor in the lower region of section 11, FIG. 2.

Thus the device will sense orthogonal airspeed along particular axes by proper orientation of the sealed chambers and ports. The use of differential pressures sensed by the chambers along the axis in accordance with the formulas given provides an accurate way for determining these airspeeds without excessive calibration, and without moving parts. It is apparent that the flows in only one direction, for example along the X—X axis, can be provided with only two chambers, and that flow in three directions can be easily acquired by using a first probe such as shown having a longitudinal axis at right angles to the plane of measurement, and a second probe having chambers positioned to sense flows in direction along this axis 14 (the probe axis would lie parallel to the plane of the X—X, Y—Y axes shown). This will give a three dimensional sensing capability. Thus there would be a fixed sensor axis at 90° to the axis 14, with two separate chambers arranged to sense pressures in the Z—Z direction, or in other words, along or parallel to the axis 14. Differential pressure sensing in two properly positioned chambers would be used for this Z—Z measurement. In a three-dimensional orthogonal system the Z—Z axis would be axis 14.

By providing suitable circuitry the relative vector of airspeed can be determined from the signals.

It should be noted that the sensing chambers 21, 22, 23 and 24 do not have to be greatly elongated, but can extend for only a limited length in axial direction, usually approximately one diameter.

In the equations given in this specification the differential pressure between associated chambers ($\Delta P_{1,2}$ or $\Delta P_{3,4}$) would be equivalent to $\Delta P21,22$ or $\Delta P23,24$ for the chambers on the drawings.

Transducers 25 and 26 can be Model 835 transducers manufactured by Rosemount Engineering Company, and Model 859 indicators 27 and 28 can be ammeter type airspeed indicators. The data from transducers 25 or 26 or both (or from other combinations used to sense other velocity vectors) can be used for manual flight control, in computer systems for automatic flight control, or fire control of guns or for many other applications.

An air temperature sensor can be incorporated right into the probe, if desired, in the lower regions of the probe. Suitable leads can be provided.

Also, heater leads 42 are provided for transmitting power to the heater.

What is claimed is:

1. A device projecting into an airstream and for sensing airspeed in at least one plane of measurement comprising a elongated cylindrical probe having a major axis generally perpendicular to the plane of measurement, at least first and second port means defined in said probe in the plane of measurement and arranged to form a port means set, said first port means in a set facing generally in opposite direction from the second port means in the set, and means to deliver a signal proportional to the square root of the pressure difference between the first and second port means.

2. The combination as specified in claim 1 wherein said probe has a longitudinal axis and said first and second port means are each symmetrically located with respect to a plane defined by said longitudinal axis and the direction axis.

3. The combination as specified in claim 1 wherein said probe is mounted to a structure at one end and said port means are positioned a minimum distance from the other end of the probe of substantially six probe diameters.

4. A device for sensing airspeed in at least one direction comprising a probe having a barrel with a longitudinal axis, wall means in said barrel dividing said barrel into at least two interior chambers forming chamber pairs, a plurality of separate ports opening to each of the chambers, said ports for each chamber in a chamber pair facing generally in opposite direction from the ports of the other chamber in the chamber pair and being oriented symmetrically with respect to a plane defined by said longitudinal axis and a line parallel to said one direction, and means to deliver a signal proportional to the pressure difference between the chambers in each chamber pair.

5. The combination as specified in claim 4 wherein said probe barrel is symmetrical about a plane defined by the longitudinal axis of said barrel and a line parallel to the direction of measurement.

6. The combination as specified in claim 4 wherein said probe barrel has a circular cross section.

7. The combination as specified in claim 4 wherein said wall means divide the barrel into four interior chambers forming two pairs of chambers, and wherein said ports are positioned to sense pressure in direction along two coplanar measurement axes which intersect said longitudinal axis, and wherein said ports for each pair of chambers are symmetrical with respect to a plane defined by the measurement axis associated with that chamber pair and the longitudinal axis of the barrel.

8. The combination as specified in claim 7 wherein said probe axis extends substantially normal to the plane defined by said measurement axes, and separate wall means defining a static pressure sensing chamber in said probe, static pressure port means opening to said static pressure chamber, said static pressure port means comprising a pair of static pressure ports facing generally in direction of normal air movement past said probe and being positioned at equal oblique angles on opposite sides of the axis of measurement extending in said normal airspeed direction, and a third static pressure port having an axis substantially coaxial with said axis of measurement extending in said normal airspeed direction and being positioned on opposite side of said probe from the pair of static pressure ports and facing generally away from said direction of air movement.

9. The device of claim 5, wherein said probe is mounted with the longitudinal axis substantially normal to the plane of normal movement of fluid past said probe, means on the interior of said probe defining a sealed static pressure sensing chamber, static pressure sensing port means opening to said static pressure chamber, said static pressure sensing port means comprising at least an even number of upstream facing static pressure sensing ports having axes positioned at equal angles on opposite sides of the axis of normal direction of flow of air past said probe and facing generally toward the direction of air movement, and at least one trailing port having a central axis lying substantially along the axis of normal direction of movement of air past said probe and facing downstream with respect to the movement of air past said probe, and means to sense the pressure in said sealed static pressure sensing chamber.

10. The probe of claim 9 wherein said downstream facing port is of smaller cross-sectional area than said upstream facing ports.

11. An air data sensing device comprising an elongated cylindrical probe having a longitudinal axis, means mounting said probe with said longitudinal axis substantially normal to a preferred flow axis having a first flow direction along said flow axis, means inside said probe dividing said probe into at least two chambers forming a pair of chambers, a plurality of separate port means opening to each of the chambers in said chamber pair symmetrically located on said probe with respect to a plane defined by said longitudinal axis and said flow axis to provide averaging of pressure in the chambers for airflows other than directly along the flow axis, the port means opening to a first of said chambers in said chamber pair being positioned to generally face said first flow direction, said port means opening to a second of said chambers facing generally away from said first flow direction and being oriented in diametrically opposed relationship to the port means opening to said first chamber with respect to said first flow direction.

12. A device for sensing the velocity vector of a fluid stream in direction along a fixed axis extending in first and second opposite directions, comprising sensing means including means defining at least first and second chambers forming a pair of chambers, said first and second chambers each having a pair of separated ports symmetrically located with respect to the fixed axis direction forming openings to their respective chambers, the major portion of the opening of said first chamber in said set facing in said first direction and being positioned in preselected relationship to the fixed axis, the major portion of the opening of the second chamber in the set facing in said second direction and being positioned in opposed relationship to the first port means with respect to the direction of the axis, and means to provide a signal which is a function of the pressure difference between the first and second chambers only and correlated to a known relationship between fluid velocity along the axis and the differential pressure between the first and second chambers.

13. The combination as specified in claim 12 wherein said first and second chambers are positioned symmetrically with respect to a first plane normal to said axis and bisecting the sensing means.

14. The combination as specified in claim 13 wherein said first and second chambers are each symmetrical with respect to a plane passing through said axis.

15. The combination as specified in claim 12 wherein said fixed axis forms one axis of a three-dimensional coordinate system having mutually perpendicular X, Y and Z axes, and wherein said first and second chambers are symmetrical with respect to a plane defined by the X and Z axes.

PO-1050
(5/69)

UNITED STATES PATENT OFFICE
CERTIFICATE OF CORRECTION

Patent No. 3,646,811          Dated March 7, 1972

Inventor(s) Richard V. DeLeo et al

It is certified that error appears in the above-identified patent and that said Letters Patent are hereby corrected as shown below:

Column 2, line 42, for "$\psi$" read $\emptyset$; Column 2, line 46 for "given" read --give--; Column 2, line 65 for "$\psi$" read $\emptyset$. Column 3, line 38, (equation 1c) delete the numeral "4". Column 6, line 9 (Claim 9, line 1) change "5" to --4--.

Signed and sealed this 11th day of July 1972.

(SEAL)
Attest:

EDWARD M. FLETCHER, JR.          ROBERT GOTTSCHALK
Attesting Officer                Commissioner of Patents